Figure 1A:
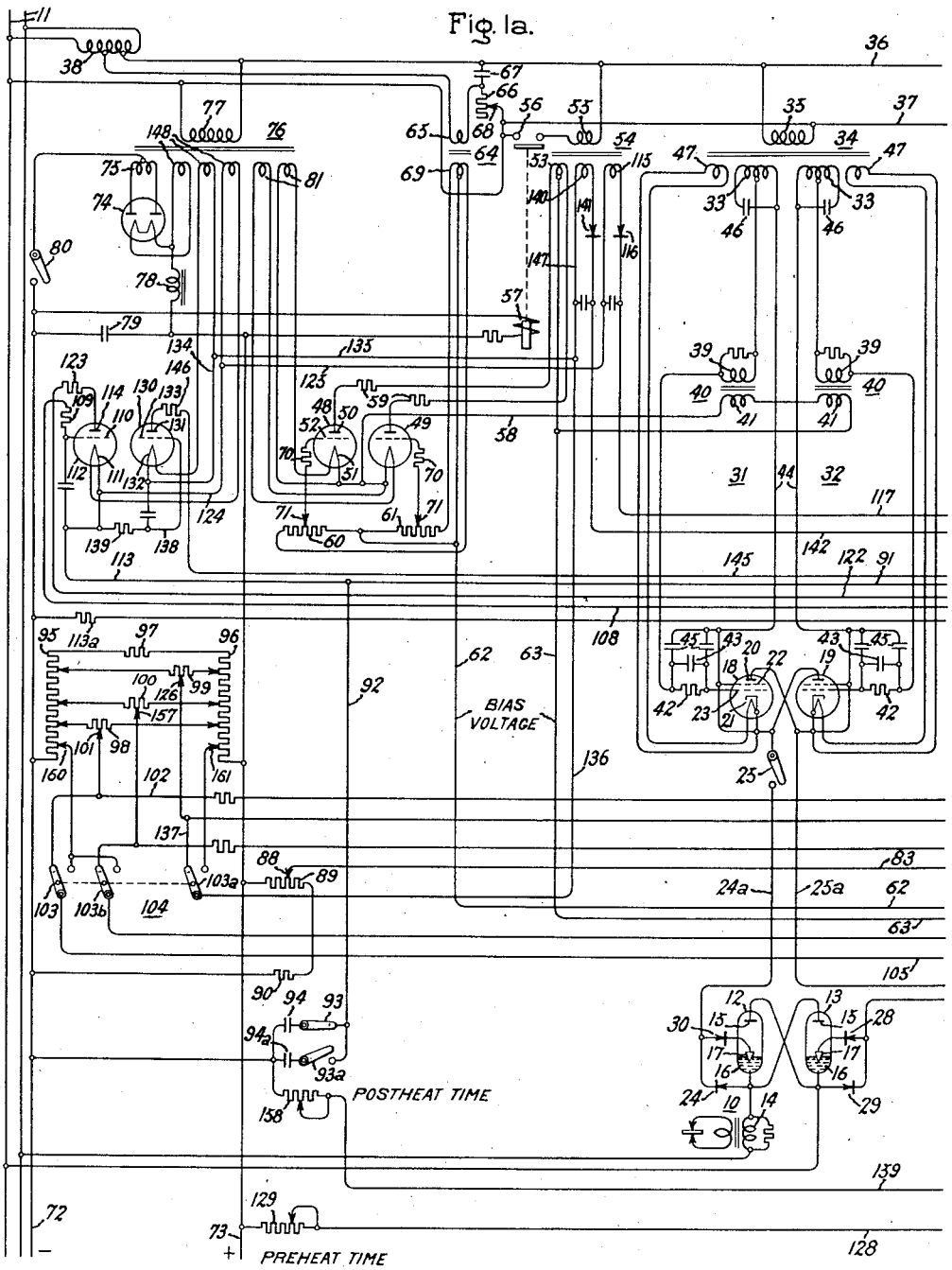

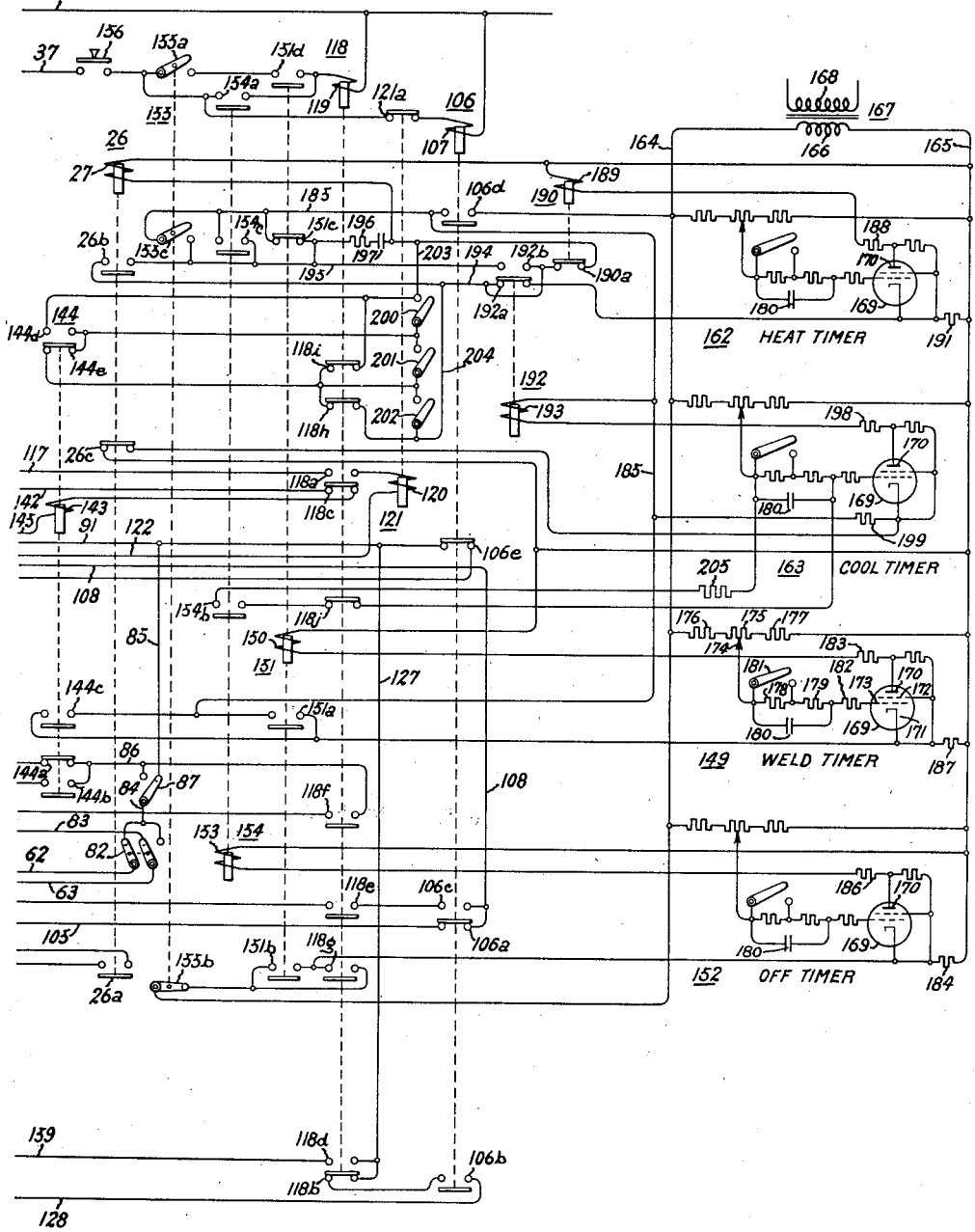

Dec. 18, 1945.   M. E. BIVENS   2,390,982
ELECTRIC CONTROL CIRCUIT
Filed Sept. 30, 1942   3 Sheets-Sheet 3
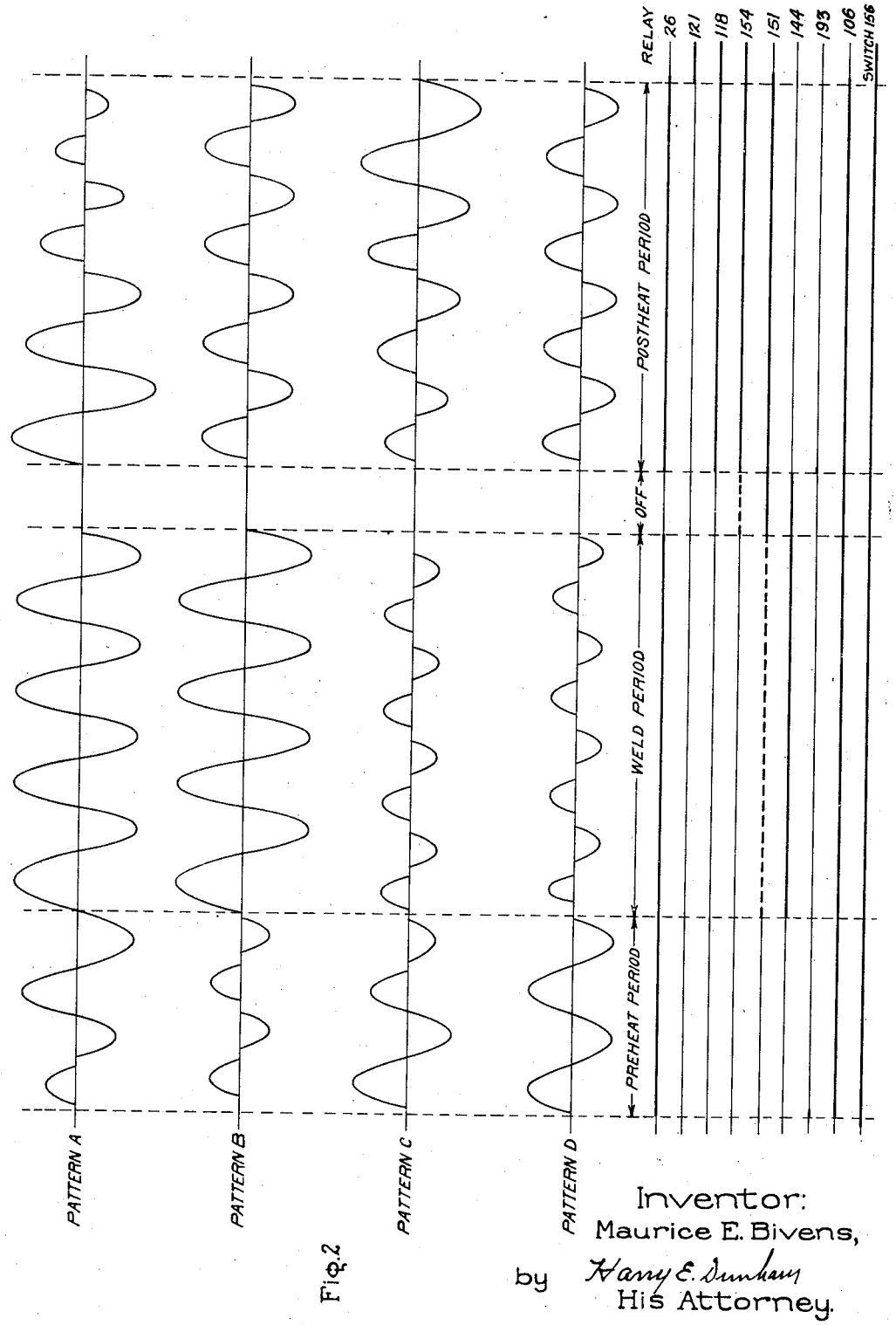
Inventor:
Maurice E. Bivens,
by Harry E. Dunham
His Attorney.

Patented Dec. 18, 1945

2,390,982

UNITED STATES PATENT OFFICE 2,390,982

ELECTRIC CONTROL CIRCUIT

Maurice E. Bivens, Schenectady, N. Y., assignor to General Electric Company, a corporation of New York Application September 30, 1942, Serial No. 460,240

22 Claims. (Cl. 250—27)

My invention relates to electric control circuits, and more particularly to improved electric valve control circuits for effecting the transfer of current to a load circuit in accordance with a predetermined pattern.

In the application of electric valve control circuits to industrial processes, such as resistance welding, there has arisen the need for improved control circuits for energizing the load with a predetermined current pattern and particularly to improved circuits having greater flexibility with respect to the current variation that may be obtained during different intervals or component parts of the complete pattern. It is also desirable to increase the flexibility of the apparatus with respect to the different types of current variations or patterns for which the system may be adjusted to increase the applications for which the equipment is suited. In accordance with the teachings of the present invention, I provide such a system which embodies means for selecting one of a number of available current patterns and also providing for the adjustment of the apparatus to permit the independent adjustment of current magnitude supplied to the load circuit at various intervals in the selected pattern as well as to control independently the rate of change of current from one magnitude to another during the pattern.

It is an object of my invention to provide a new and improved electric valve control system.

It is another object of my invention to provide a new and improved electric translating apparatus for effecting the energization of a load circuit in accordance with a selected one of a number of current patterns.

It is another object of my invention to provide a new and improved electric valve control circuit for effecting the energization of a load circuit in accordance with a current pattern which may be preselected and in which the extent of current variation and length of time interval of the various portions of the pattern may be adjusted independently.

It is still another object of my invention to provide a new and improved resistance welding system which may be readily adjusted to accommodate the system for a wide variety of work with respect to composition or dimensions of the work piece.

In accordance with an illustrated embodiment of my invention a welding transformer is energized from an alternating-current supply circuit through electric valves of the immersion ignitor type which are reversely connected in parallel. The periods during which the welding transformer is energized are determined by a switching device connected in circuit with the ignitors and which is controlled by timing means to complete the circuit of the ignitors and the control valves therefor for the intervals during which current is to be supplied to the load circuit. The magnitude of the current supplied to the welding transformer is controlled by phase controlling the electric valves, which is in turn effected by means of a bias control voltage impressed on the control members of a pair of control valves and which is varied in accordance with the variation in current magnitude of the selected current pattern to be supplied to the welding transformer. The bias voltage is a variable voltage existing between a reference point and one terminal of a capacitor having charging circuits which are altered at various points in the welding pattern to effect the different types of current variation desired during different intervals of the total current pattern or, for other patterns, the bias voltage remains constant for a portion of the pattern and then is abruptly changed to a second value dependent upon the setting of a variable tap on a voltage divider under the control of a timer. The charging of the capacitor is also utilized to determine the duration of certain of these intervals in cooperation with additional control electric valve means and electromagnetic switching devices.

In general, the system contemplates a current pattern which may comprise a preheat period, a welding period, an off period, and a postheat period in which the initial value of preheat current, the magnitude of the welding current, and the final value of postheat current are all independently adjustable and in which the duration of the preheat, weld, off, and postheat periods are also independently adjustable. The system also contemplates a gradual variation of current magnitude, either increasing or decreasing during either the preheat or postheat periods. By selectively operating certain manual switches, it is possible to alter the pattern so that the magnitude of current during each of the periods is of a constant magnitude and to decrease the off period to zero if desired. In the above description, reference has been made to preheat, weld, off, and postheat periods. In this description, it has been assumed that the entire current pattern takes place with the electrodes stationary to accomplish one weld. It is also possible to utilize these current patterns particularly if the off period is reduced to zero to accomplish a seam weld in which the current gradually increases, is maintained constant, and then gradually decreases or, in accordance with another pattern, remains constant at one value for a period, changes to another value for a second period, and alters again to a third value for a third period. In accordance with another pattern, the current gradually decreases during the first period, is maintained at a constant value for a second period, and gradually increases in value for a third period. Thus, the system is very flexible, providing for almost any current variation desired over a complete pattern including a plurality of intervals or periods of different types of current variation.

In accordance with the illustrated embodiments, provision is also made for effecting intermittent energization of the load during any one of the plurality of periods making up a complete pattern. For example, if a complete current pattern represents a single weld with the electrodes stationary, the intermittent energization during each of the periods may be referred to as "pulsation" welding. This intermittent energization is accomplished by means of electronic timers which operate the switching means in the control member circuit of the main electric valves.

My invention will be better understood by reference to the following description taken in connection with the accompanying drawings and its scope will be pointed out in the appended claims. In the drawings Figs. 1A and 1B considered together are a schematic representation of one embodiment of my invention, and Fig. 2 illustrates various current patterns which may be supplied to the load circuit of the arrangement shown in Figs. 1A and 1B, together with a schematic representation of the operating conditions of a number of the electromagnetic switching devices at various times during the current pattern.

Referring now to Figs. 1A and 1B of the drawings, I have shown my invention embodied in an electric valve control circuit for energizing a load, such as a welding transformer 10 from an alternating current supply circuit 11 in accordance with a selected one of a plurality of current patterns. The flow of current from the supply circuit to the welding transformer is controlled by a pair of electric valves 12 and 13 which are reversely connected in parallel between the supply circuit and the primary winding 14 of the transformer 10. Electric valves 12 and 13 may be of any of the types well known in the art and, as illustrated, each comprises an anode 15, a cathode 16 of conducting liquid such as mercury, and an immersion ignitor type of control member 17.

As is well understood by those skilled in the art, the electric valves 12 and 13 illustrated in the drawings are of the type requiring the passage of a predetermined minimum current to the control members 17 thereof to initiate conduction of the electric valves. As illustrated, the passage of current to the control members 17 of the electric valves 12 and 13 is controlled by the firing or trigger valves 18 and 19, which are preferably of the type utilizing an ionizable medium and each comprising an anode 20, a cathode 21, a shield grid 22, and a control member or grid 23. The electric valves 18 and 19 are reversely connected in parallel and have the anode-cathode circuits thereof energized in accordance with the anode voltages of the electric valves 12 and 13, respectively. As is readily seen from the drawings, the anode-cathode circuit of electric valve 19 is completed from the anode of electric valve 13 through a unilaterally conducting device 24, such as a dry rectifier, a conductor 24a, switch 25, a conductor 25a, the normally open contact 26a of an electromagnetic switching device 26 having an operating coil 27, a unilaterally conducting device 28, the control member 17 to the cathode of the electric valve 13. From an inspection of the drawings, it will be seen that when electric valve 13 is nonconducting, the anode-cathode voltage thereof is impressed on the anode-cathode circuit of the control or firing valve 19. The anode-cathode circuit of the control valve 18 is completed from the anode of electric valve 12 through a unilaterally conducting device 29, the normally open contact 26a of the switching device 26, conductor 25a, switch 25, conductor 24a, a unilaterally conducting device 30, and the control member 16 of electric valve 12 to the cathode 15 of the electric valve 12. Inasmuch as the contact 26a is in the anode-cathode circuit of both of the control valves 17 and 18, it is apparent that no current for initiating discharge of electric valves 12 and 13 may be conducted through the ignitor type control members 16 when contact 26a is open. This contact, accordingly, provides means for determining the periods of energization and deenergization of the welding transformer.

In order that the time in the anode-cathode voltage of electric valves 12 and 13 may be controlled to control the voltage or root-mean-square value of current supplied to the welding transformer, I provide an improved control circuit for controlling the control members 23 of the control valves 18 and 19. The control member of each of these valves is energized by the excitation circuits illustrated generally by the numerals 31 and 32, respectively, which are identical so that only one will be described and the same reference numerals will be applied to corresponding parts of both of the excitation circuits. Referring to excitation circuit 31 for energizing control member 23 of electric valve 18, a source of hold-off alternating-current voltage is provided by the secondary winding 33 of a transformer 34 having the primary winding 35 energized from a supply of alternating-current control voltage provided by conductors 36 and 37 which are energized from the alternating-current supply circuit 11 by means of a voltage-dividing reactor 38. The secondary winding 33, which provides the hold-off voltage, is connected in series with the secondary winding 39 of a transformer 40 having a primary winding 41 which is energized to provide a peaked wave form voltage for overcoming the effect of the hold-off voltage of winding 33 to render electric valve 18 conductive at the desired instant in the anode-cathode voltage wave of the valve 12 in a manner which will be described more in detail at a later point in the specification. The circuit of the control member 23 includes a self-biasing resistor 42 and parallel connected capacitor 43. The circuit to the cathode of the electric valve 18 is completed from a terminal of the transformer winding 33 through conductor 44 which is also connected with the shield grid 22 to maintain the same at cathode potential. Filter capacitors 45 are connected between the cathode and opposite side of the biasing resistor to eliminate the effect of transients on the excitation circuit. A filter capacitor 46 is also connected across the transformer winding 33. A secondary winding 47 of the transformer 34 provides a source of cathode heating current for the valves 18 and 19.

The self-biasing means including resistor 42 and capacitor 43 together with the hold-off alternating-current voltage of transformer 33 provide means for normally rendering electric valves 18 and 19 nonconductive. As mentioned previously, a turn-on voltage is introduced in the excitation circuits 31 and 32 by means of the transformer secondary windings 39. In order to determine the instant that electric valves 18 and 19 are rendered conductive and, consequently, the instants at which electric valves 12 and 13 are rendered conductive, the transformer windings 41 are energized in timed relation with the anode-cathode voltage supplied to electric valves 12 and 13 in accordance with the magnitude of current which is to be supplied to the load circuit for the particular pattern of welding current for which the system has been adjusted. In order to control the electric valves 18 and 19, I provide a pair of electric discharge valves 48 and 49 for energizing the primary windings 41 of the transformers 40 of the excitation circuits 31 and 32. The electric valves, as illustrated, are of the type utilizing an ionizable medium and each comprises an anode 50, a cathode 51, and a control member or grid 52. A source of alternating-current voltage for energizing the anode-cathode circuits of electric valves 48 and 49 is provided by a mid-tapped secondary winding 53 of a transformer 54 having the primary winding 55 thereof energized from the alternating-current control voltage supply 36, 37 through the normally open contacts 56 of an electromagnetic switching device 57. The cathodes of the electric valves 48 and 49 are electrically connected together and this common connection is connected by conductor 58 through the primary windings 41 in series to the midtap of winding 53, the end terminals of which are connected through suitable current-limiting resistors 59 to the anodes 50 of the electric valves 48 and 49, respectively. The control members 52 of electric valves 48 and 49 are each energized by an alternating-current component of voltage supplied by resistors 60 and 61 and a direct-current component of voltage or bias impressed across conductors 62 and 63 by a control circuit to be described in detail at a later point in the specification. The voltage impressed across resistors 60 and 61 preferably lags the voltage impressed on the anode-cathode circuit of electric valves 48 and 49, respectively, by substantially 90 electrical degrees and is derived from the alternating-current control voltage supply 36, 37, by means of a transformer 64 having the primary winding 65 thereof connected between an intermediate point on the voltage-dividing reactor 38 and the common terminal of a series connected resistor 66 and capacitor 67 which are energized by the voltage of the alternating-current supply 36, 37. An adjustable tap 68 on the resistor 66 provides means for adjusting the phase of the alternating-current voltage impressed on the transformer primary winding 65. The secondary winding 69 of the transformer 64 is provided with a midtap which is connected to the common terminal of resistors 60 and 61 and also to the conductor 62. The end terminals of transformer winding 69 are connected respectively with the end terminals of the resistors 60 and 61. The control members 52 of electric valves 48 and 49 are connected with resistors 60 and 61, respectively, through suitable current-limiting resistors 70 by means of adjustable taps 71. The circuit between the control members of valves 48 and 49 is completed from the conductor 63 through transformer windings 41 and conductor 58. From the previous description, it will be seen that the control members of electric valves 48 and 49 are energized in accordance with the alternating-current voltage appearing across a portion of resistors 60 and 61, respectively, and the voltage impressed across conductors 62 and 63. Thus, it is seen that the time in the anode-cathode voltage of electric valves 48 and 49 at which they are rendered conductive may be controlled by controlling the voltage impressed on conductors 62 and 63.

In the previous description, it has been pointed out that the time of conduction of valves 48 and 49 controls the electric valves 12 and 13 through transformers 40 and electric valves 18 and 19. The control circuit for controlling the voltage impressed on conductors 62 and 63 will now be described. The source of energy for this control circuit is provided by the direct-current control voltage supply comprising conductors 72 and 73 which are energized by the output of a full wave electric valve rectifier comprising an electric valve device 74 having two discharge paths which are energized by the midtapped secondary winding 75 of a transformer 76 having the primary winding 77 thereof energized from the alternating-current control voltage supply 36, 37. The output of the electric valve rectifier is filtered by a series inductive impedance 78 and parallel capacitor 79 before it is impressed upon the direct-current supply conductors 72, 73. A switch 80 is preferably connected in one of the supply lines of the direct-current circuit and, as illustrated, is connected in the conductor 72. The transformer 76 is provided with secondary windings 81 for heating the cathodes 51 of electric valves 48 and 49.

Before proceeding further with the description of the system of the illustrated embodiment of my invention, brief reference may be had to Fig. 2 of the drawings to obtain a better understanding of the type of control to be accomplished by the remainder of the system which determines the magnitude of the load current supplied as well as the duration of the four periods into which the current pattern is divided; namely, the preheat period, weld period, off period, and postheat period.

Referring particularly to Fig. 2, pattern A, it will be noted that the magnitude of the current steadily increases during the preheat period, is maintained at constant magnitude during the weld period, and gradually decreases from the weld current magnitude to a final value at the end of the postheat period. The circuit for controlling the variations in magnitude of the current as well as the duration of the preheat and postheat periods, will now be described.

Referring again to Figs. 1A and 1B, it will be noted that the conductors 62 and 63, which impress the control voltage on the control members of electric valves 48 and 49 to control the magnitude of the current supplied to the welding transformer by electric valves 12 and 13, are connected to the movable contacts 82 of a reversing switch, the fixed contacts of which are connected with conductors 83 and 84. It will also be readily appreciated that the voltage appearing between conductors 83 and 84 may be impressed on the conductors 62, 63 in opposite senses by moving the movable contacts 82 from one extreme position to the other. The conductor 84 may be selectively connected with conductor 85 or conductor 86 by the single-pole, double-throw switch 87. Thus, with switches 82 and 87 in the position shown, the voltage impressed on conductors 62 and 63 is determined by the voltage of conductors 83 and 85. The conductor 83 is maintained at a voltage intermediate the direct-current control voltage conductors 72, 73 determined by the position of an adjustable tap 88 on a voltage-dividing resistor 89 which is connected in series with resistor 90 across the direct-current control voltage supply 72, 73. The conductor 85 is connected by conductors 91 and 92 and a switch 93 to one terminal of a capacitor 94, the other terminal of which is connected to the negative side 72 of the direct-current control voltage supply. Thus, it is seen that the voltage of conductor 83 may be adjusted to a predetermined value between the voltage of conductors 72, 73 of the direct-current supply voltage and that the conductor 85 has a voltage positive with respect to the negative direct-current line 72 by an amount dependent upon the charge on the capacitor 94. A capacitor 94a and a switch 93a may be connected in parallel with switch 93 and capacitor 94 to provide an extended range of operation. In order to provide adjustable voltages intermediate the voltages of the direct-current supply conductors 72, 73 which may be selected in advance to determine the condition of charge of the capacitor at different periods of the current pattern, such as beginning of preheat period, end of preheat period, weld period, and end of posthead period, I provide voltage dividing resistors 95 and 96 connected in series with a resistor 97 across the direct-current supply lines 72, 73. Connected between adjustable points on resistors 95 and 96 are resistors 98, 99, and 100. An adjustable tap 101 on resistor 98 establishes the initial charge on condenser 94 and, therefore, determines the value of current transmitted to the load circuit at the beginning of the preheat period as will be better understood by tracing this charging circuit. Starting with the tap 101 on the voltage dividing resistor 98, the circuit extends by way of a conductor 102, contact 103 of a manual switch 104, conductor 105, normally closed contacts 106a of an electromagnetic switching device 106, having an operating coil 107, conductor 108, a current-limiting resistor 109, control member 110 and cathode 111 of an electric discharge device 112, conductor 113, conductor 92, switch 93, capacitor 94 to the negative line 72 of the direct-current control voltage supply. Thus the capacitor 94 charges to the voltage between the direct-current supply line 72 and the tap 101 through the control-member-to-cathode circuit of the electric valve 112 to establish the initial charge on capacitor 94 and thereby establish the magnitude of the load current at the beginning of the preheat period. Inasmuch as this charging circuit of capacitor 94 includes a unilaterally conductive path from the control member to the cathode of valve 112, it is necessary that capacitor 94 be discharged prior to the establishment of the circuit for charging the capacitor to the initial preheat setting. This is accomplished by a discharge circuit for capacitor 94 including resistor 113a and the normally closed contacts 106e of switch 106. The electric valve 112 is preferably of the type employing an ionizable medium and comprises in addition to the control member 110 and cathode 111 an anode 114. The anode-cathode circuit of the electric valve 112 is energized from a secondary winding 115 of the transformer 54 through a circuit including in series a unilaterally conducting device 116, conductor 117, normally open contacts 118a of an electromagnetic switching device 118 having an operating coil 119, the operating coil 120 of an electromagnetic switching device 121, conductor 122, resistor 123, the anode-cathode circuit of electric valve 112, conductor 124, conductor 125, to the other terminal of the transformer winding 115. The preheat time, or first interval of the current pattern, is determined by the time required for the capacitor 94 to charge from its initial value determined by the position of the adjustable tap 101 to a final value determined by the position of an adjustable tap 126 on the voltage-dividing resistor 99, which also determines the magnitude of the current during the welding interval as will be described more in detail at a later point in the specification. The capacitor 94 charges during the preheat period from the direct-current supply 72, 73, through conductor 92, conductor 91, conductor 127, normally closed contacts 118b of the electromagnetic switching device 118, the normally open contacts 106b of the switching device 106, conductor 128, and an adjustable resistance 129. When the capacitor 94 charges to a value dependent upon the setting of the adjustable tap 126 on the voltage dividing resistor 99, the second interval of the current pattern or the welding interval is initiated by the initiation of conduction of an electric valve 130 which is similar to the electric valve 112 and comprises an anode 131, a cathode 132, and a control member or grid 133. The cathode 132 of the electric valve is connected with the adjustable tap 126 by means of a conductor 134, a conductor 135, a conductor 136, the movable contact 103a on manual switch 104, and conductor 137. The control member 133 of electric valve 130 is connected by conductor 138, resistor 139, conductor 113, conductor 92, and switch 93 to the positive terminal of the capacitor 94. The anode-cathode circuit of the electric valve 130 is energized from a fourth winding 140 on the transformer 54, one terminal of which is connected to the anode of the valve 130 through a unilaterally conducting device 141, conductor 142, normally closed contacts 118c of an electromagnetic switching device 118, the operating coil 143 of an electromagnetic switching device 144, conductor 145, and resistor 146. The other terminal of the transformer winding 140 is connected with the cathode of electric valve 130 through conductor 147, conductor 135, and conductor 134. The cathodes of electric valves 74, 112, and 130 may be heated by energy supplied by the windings 148 of the transformer 76. The voltage of conductor 85 is then maintained at a voltage determined by the setting of the tap 126 or the weld heat adjustment until the termination of the weld interval, or period, which is determined by means of an electronic timer illustrated generally by the numeral 149 and bearing the legend "Weld timer" which operates to energize the operating coil 150 of an electromagnetic switching device 151 at the end of the weld period. If the system is adjusted for a current pattern having an off period, such as the pattern illustrated in Fig. 2A, the termination of the welding interval and closure of the contacts 151b of relay 151 initiates an off period by starting the timing operation of another electronic timer illustrated generally by the numeral 152 and bearing the legend "Off timer." The off timer effects the energization of the operating coil 153 of electromagnetic switching device 154 at the end of the off period and closes the normally open contacts 154a to establish a shunt circuit around the contact 155a of the manual switch 155 and completes the energizing circuit for the electromagnetic switching device 118 from the alternating-current supply lines 36 and 37 through the manually operable initiating switch 156. The operation of switching device 118 closes normally open contacts 118d to complete the discharging circuit for capacitor 94 for the postheat interval during which time it discharges charges from the voltage of the movable tap 126 of voltage divider 99 to the movable tap 157 of the voltage divider 100. This discharging circuit of the capacitor 94 may be traced from the negative side 72 of the direct-current circuit which is also the negative terminal of capacitor 94 through the variable resistor 158, conductor 159, contacts 118d, conductor 127, conductor 91, conductor 92, switch 93, to the other terminal of capacitor 94. When the capacitor 94 reaches the voltage of the adjustable tap 157 of voltage-dividing resistor 100, electric valve 114 is rendered conductive; inasmuch as the cathode thereof is connected with the positive terminal of the capacitor 94 and the control member thereof is, at this time, in the current pattern connected with the tap 157. This latter circuit may be traced from the tap 157 of the voltage-dividing resistor 100 through contact 103b of switch 104, contacts 118e of the switching device 118, the contacts 106c of the switching device 106, conductor 108, and resistor 109. Conduction of electric valve 112 energizes the operating coil 120 of switching device 121 to open the contacts 121a and terminate the current pattern by interrupting the circuit of coil 107 of switching device 106.

In the above description, the control of the electric valves 12 and 13 by controlling the bias impressed on conductors 62 and 63 has been described with the manual switch 87 connected to conductor 85. If manual switch 87 is connected with conductor 86 the voltage impressed on the conductors 62 and 63 then becomes the voltage between conductors 83 and 86. As previously mentioned, conductor 83 is connected to an adjustable point on resistor 89 to determine a reference voltage. The voltage of conductor 86 is varied to determine the current pattern. By reference to the drawings, it will be noted that conductor 86 is connected to the adjustable tap 101 of voltage-dividing resistor 98 through normally closed contacts 144a of switching device 144; to the adjustable tap 126 of voltage-dividing resistor 99 through normally open contacts 144b of the switching device 144; and to the adjustable tap 157 of the voltage-dividing resistor 100 through the normally open contacts 118f of the switching device 118. Thus, the voltages between conductor 83 and the taps 101, 126, and 157, respectively, of the voltage-dividing resistors 98, 99, and 100 are impressed on the conductors 62 and 63 during successive intervals, namely, the preheat, weld, and postheat intervals of the current pattern illustrated in Fig. 2B in accordance with the operation of the electromagnetic switching devices 118 and 144.

From the foregoing description, it is seen that, when the apparatus is set for either pattern B or D, the bias voltage impressed on the control members of electric valves 48 and 49 is changed abruptly at the ends of the different intervals to the values established by the voltage-dividing resistors 98, 99 and 100. Since the settings of the taps on these resistors also effect the length of the preheat and postheat periods as a result of establishing the initial and final charge on the capacitor 94 for these intervals, it is apparent that adjustment of current magnitude for any of the periods will require a readjustment of the timing resistors 129 and 158. In order to provide that the timing during preheat and postheat periods shall be entirely independent of the current magnitude during current patterns such as illustrated in Fig. 2, patterns B and D, I provide means for determining the condition of charge of the condenser 94 at the beginning of preheat, end of preheat and end of postheat independently of the magnitude of the current supplied during these intervals by the manual switch 104 which, when moved to its right-hand position, connects the control member of electric valve 112 with an adjustable tap 160 on resistor 95 through one path containing normally closed contacts 106a of electromagnetic switch 106 and a parallel path through normally open contacts 118c and 106c in series of switching devices 118 and 106, respectively. The cathode of the control electric valve 130 is connected directly with an adjustable tap 161 on the resistor 96 through contact 103a, conductor 136, conductor 135, and conductor 134. In this way, the charge on the condenser at the beginning of preheat, the charge on the condenser at the end of preheat which is also the charge on the condenser 94 at the end of the weld or off period, and the charge on the condenser 94 at the end of the postheat period are established by the taps 160 and 161 so that the timing of these periods is rendered entirely independent of the load current magnitude during these periods for which the system is adjusted and the timing of the preheat and postheat periods are determined only by the settings of taps 160 and 161 and the adjustment of resistors 129 and 158, none of which need to be adjusted when the magnitude of load current is adjusted by taps 101, 126, and 157.

At an earlier point in the specification, reference has been made to electronic timers 149 and 152 which determine, respectively, the length of the welding period and the off period of current patterns A to D of Fig. 2, inclusive. Heat and cool timers 162 and 163, respectively, are also provided to effect intermittent energization of the load circuit during any one of the three periods of energization of the current pattern illustrated. This adapts the system for what is termed "pulsation welding" when the electrodes are stationary throughout the current pattern as they are when the system is being used for "spot welding."

Electronic timers 149, 152, 162, and 163 are energized from an alternating-current supply which, as illustrated, comprises conductors 164 and 165 energized from the secondary winding 166 of a transformer 167, the primary winding 168 of which is energized from any suitable source, which may be the alternating-current supply circuit 11. Each of the timers comprises an electric discharge valve 169 preferably of the type utilizing an ionizable medium, such as a gas or vapor, and comprising an anode 170, a cathode 171, a shield grid 172 and a control member of grid 173. In each of the timer circuits, the shield grid is connected directly to the cathode. The control member is energized from an adjustable tap 174 on a voltage-dividing resistor 175 which is connected in series with resistors 176 and 177 across the lines 164 and 165. The circuit between the adjustable tap and the control member includes resistors 178 and 179 which are paralleled by a capacitor 180. Manually operable switch 181 connected in parallel with resistor 178 provides means for changing the range of operation of the timers. A current-limiting resistor 182 is connected in series with each of the control members. The circuit between the cathode of the electric valves 169 of each of these timers is connected with one of the alternating-current lines 164 or 165 through a switch which is closed to initiate the timing operation. Before the initiating switch is closed, the capacitor 180 is charged to a value dependent upon the position of the adjustable tap 174 by grid rectification. Upon closure of the switch in the cathode circuit, no further grid rectification takes place and the electric valve becomes conductive an interval of time after closure of the switch in the cathode circuit dependent upon the constants of the circuit including the voltage of the adjustable tap 174 and the time constant of the discharge circuit of capacitor 180. A timer circuit of this type is claimed and more fully described in Patent No. 2,171,347—Schneider, dated August 29, 1939, and assigned to the same assignee as the present invention. The initiating circuits or switches and the operated relays of the timers 149, 152, 162, and 163 are arranged to provide a particular sequence of operation in the illustrated embodiment of the present invention and will now be considered individually in more detail.

Referring now to the weld timer 149, the anode 170 of the valve 169 thereof is connected to the conductor 165 through a resistor 183 and the operating coil 150 of the electromagnetic switching device 151. The cathode of the electric valve of the timer 149 is connected with conductor 165 through a resistor 187 and to the conductor 164 through a pair of parallel circuits, a conductor 185 and the normally open contacts 106d of the electromagnetic switching device 106 to conductor 164. One of the parallel circuits includes the normally open contacts 144c of the switching device 144 and the other includes normally open contacts 151a of the switching device 151. Similarly, the off-period timer 152 has the anode 170 of the electric valve 169 thereof connected with conductor 165 through a resistor 186 and the operating coil 153 of an electromagnetic switching device 154. The cathode of the electric valve is connected to the conductor 164 through the normally closed contacts 155b of the manual switch 155 and two parallel circuits, one of which includes the normally open contacts 151b of the switching device 151 and the other of which includes the normally open contacts 118g of the switching device 118. The cathode of the electric valve 169 of the timer 152 is also connected with the conductor 165 through resistor 184.

The heat timer 162 is connected in essentially the same manner as the weld timer 149 with the anode 170 of the electric valve 169 thereof connected to the conductor 165 through a resistor 188 and the operating coil 189 of an electromagnetic switching device 190 and the cathode thereof connected with the conductor 165 through resistor 191. The initiating circuit for the timer 162 or the connection between the cathode of the electric valve 169 thereof and the conductor 164 is arranged to be selectively completed by the operation of different combinations of a plurality of electromagnetic switching devices. By reference to the drawings, the circuit of the cathode of the electric valve 169 of the timer 162 may be traced through normally closed contacts 192a of an electromagnetic switching device 192 having the operating coil 193 thereof energized in accordance with the operation of the cool timer 163 to a conductor 194. From conductor 194, the circuit may be traced either through the normally open contacts 26b of the switching device 26 or the normally open contacts 192b of the switching device 192 to conductor 195 through one of three parallel circuits to the conductor 185, the first of which includes the normally closed contacts 151c of the switching device 151, the second of which includes the normally open contacts 154c of the switching device 154, and the third of which includes the normally open contacts 155c of manual switch 155. Conductor 185 is connected to the conductor 164 through the normally open contacts 106d of the switching device 106. It will be noted that the energizing circuit for the operating coil 27 of the switching device 26 starting with conductor 164 includes the same contacts as the initiating circuit for the heat timer until the conductor 194 is reached. From conductor 194, the circuit of coil 27 is completed to conductor 165 through the normally closed contact 190a of the switching device 190 controlled by the heat timer 162. A series-connected resistor 196 and capacitor 197 between conductor 195 and one terminal of the coil 27 of the switching device 26 provide means for suppressing transients set up by switching operations in the circuit of coil 27.

The circuit of the cool timer is somewhat different from the circuit of the other timers in order to insure that the system will always operate to provide a heat period first when adjusted for pulsation welding. The anode-cathode circuit of the electric valve 169 of the cool timer is reversed with respect to the supply conductors 164 and 165. By reference to the drawings, it will be noted that the anode of electric valve 169 of timer 163 is connected with conductor 164 through the contacts 106d of switching device 106, conductor 185, the operating coil 193 of switching device 192, and resistor 198. The cathode is connected to conductor 185 through a resistor 199 and to the conductor 165 through the normally closed contact 26c of the switching device 26. From a consideration of this circuit, it will be seen that the anode-cathode circuit of the electric valve of the cool timer is completed through the normally closed contacts 26c of the switching device 26 before the contacts 106d are closed in response to a closure of the weld-initiating switch 156. This insures that the cool timer will be in the timed-out condition initially and permit a period of heating to start immediately after closure of the weld-initiating switch when the system is adjusted for pulsation welding. As soon as the switching device 26 operates to initiate a period of energization of the load circuit, the contact 26c is opened and the cool timer is reset.

As previously mentioned, the heat and cool timers 162 and 163 are provided to effect pulsation welding or, in other words, intermittent energization of the load circuit during any one of the periods of the current pattern being supplied to the load circuit. In order to render it possible to provide pulsation or regular welding during any one of the intervals, I provide means for selectively disabling both the heat and the cool timers during any one of the periods. Manual switches 200, 201, and 202 are connected in series and across the contact 190a, controlled by the heat timer, by conductors 203 and 204. Short circuiting of contact 190a prevents the heat timer from interrupting the circuit of the operating coil 27 of switch 26 and, in this way, prevents the opening of the contacts 26a in the circuit of the control members of the main electric valves 12 and 13 and also prevents the closing of the contact 26c which would start a timing period of the cool timer 163. The selective short circuiting of the contact 190a during different periods of the current pattern to be supplied to the load is accomplished by contacts on the switching devices 118 and 144 which shunt different ones of the manual switches 200 to 202, inclusive. As seen from the drawings, the normally closed contact 118h of switch 118 is connected in parallel with manual switch 202 and the normally open contact 118i of this switch is connected in parallel with manual switches 200 and 201 in series. The normally open contact 144d of switching device 144 is connected in parallel with the manual switch 200 and the normally closed contact 144e is connected in shunt with the manual switch 201. If it is desired to provide pulsation welding during the first interval of energization of the load circuit which has been designated "the preheat period" in Fig. 2, switch 200 is opened and the shunt circuit around the contact 190a is open as long as the operating coils of both switching devices 118 and 144 are deenergized. As will become more apparent from the operation of the system as a whole, this condition exists only during the preheat period. Similarly, if pulsation welding is desired during the weld period, switch 201 is opened and switches 200 and 202 closed. This will open the circuit shunting contact 190a and thus disable the heat and cool timers when contact 144e is open and before contact 118i is closed by operation of switching means 118. As will be explained in more detail later, this condition occurs only during the weld period. Similarly, if manual switches 200 and 201 are closed and manual switch 202 opened, contact 190a will be shunted at all times except when contact 118h is opened. This occurs only during the postheat period. Thus the switches 200, 201, and 202 and the contacts 144d, 144e, 118h, and 118i provide means for disabling the heat and cool timers 162 and 163, respectively, for any of the periods of energization of the load circuit.

In order to insure that the off-period timer will control the length of the off period even though the cool-period timer is set for a longer period than the off-period timer and is not disabled by the position of switches 200 to 202, inclusive, I provide means for insuring that the cool timer 163 times out immediately after the off-period 152 times out. This is accomplished by completing a low-impedance path in shunt with the capacitor 180 of cool timer 163 by means of the normally open contact 154b on the switch 154 which is operated when the cool timer times out. The resistance element 205 connected in the shunt circuit is of relatively low value to discharge capacitor 180 as rapidly as possible without damaging any of the circuit elements. A normally closed contact 118j on relay 118 is connected in series with this shunt circuit to permit the cool timer to function during the postheat period if switch 202 is opened.

Although a detailed description of the operation of the various parts of the illustrated embodiment of my invention has been included with the foregoing description of the elements of the system, it is believed that a consideration of the operation of the system in general when adjusted for different heat patterns will further bring out the features and advantages of the present invention. A table showing the condition of the various relays of the system at any time during the current pattern has been shown in connection with Fig. 2. In this table, a heavy line has been used to indicate that the operating coil of the relay is energized and that the relay has operated. In the case of the relay controlled by the timers, the dotted line has been shown to indicate the interval which the timer is measuring and the solid line indicates the period during which the relay of the timer is energized. After the alternating-current supply circuit 11 has been energized for a time sufficient to bring the filaments of all of the electric valves to operating temperature, the switches 25 and 80 may be closed. It will be understood that a time-delay relay may be used for this purpose. Closure of the switch 80 operates the relay 57 to close the contact 56 thereby to energize the anode-cathode circuit of electric valves 48 and 49 and electric valves 112 and 130. The operation of the system will now be described when the switches are adjusted to supply to the load circuit the current pattern illustrated in Fig. 2A. Manual switches 82, 87, and 155 are in the position illustrated in the drawings and switches 200, 201, and 202 are closed. The capacitor 94, which provides the unidirectional control voltage for controlling the magnitude of the current supplied to the load circuit, is charged to a value dependent upon the setting of the adjustable tap 101 on the preheat voltage-dividing resistor 98. The discharge circuit across capacitor 94 including the resistor 113a insures that the charge on the capacitor is determined by the tap 101 in the event that the residual charge on the capacitor from a previous operation is greater than would result from the setting of the tap 101. This provision is necessary since the charging circuit for the capacitor to the voltage determined by the tap 101 includes a unilaterally conducting path from grid to cathode of the electric valve 112. If, now, the initiating switch 156 is closed, the operating coil 107 of the relay 106 is energized to open contacts 106a and 106e and to close contacts 106b, 106c, and 106d. Opening of contact 106e opens the discharge circuit for capacitor 94 including the resistor 113a and the opening of contact 106a in the circuit of the control member of electric valve 112 interrupts the charging circuit of the capacitor 94 through which the capacitor has charged to a voltage dependent upon the setting of the tap 101 on the preheat resistor 98. Closure of contact 106c partially completes a circuit between the control member of the electric valve 112 and the adjustable tap 157 on the postheat resistor 100. This circuit is completed at a later point in the current pattern by operation of the relay 118. Closure of contact 106d of the relay 106 connects the supply line 164 of the alternating-current control voltage supply to the conductor 185. This impresses anode-cathode voltage on the electric valve of the cool timer 163. As previously mentioned, the cool timer is initially in timed out condition so that the relay 192 controlled by the cool timer 163 picks up immediately upon closure of the contact 106d of relay 106. The closure of these latter two contacts completes a circuit for the operating coil 27 of relay 26 through normally closed contact 151c of the weld timer relay 151 and the contact 190a of the heat timer relay 190. This picks up relay 26 to move contacts 26a and 26b to closed positions and to open contact 26c. Closure of contact 26b establishes a holding circuit for the coil 27 in shunt with the contact 192b of the cool timer relay 192. Opening of contact 26c opens the anode-cathode circuit of the electric valve 169 of the cool timer 163 to reset the same. The closure of contact 26a completes the circuit between the immersion ignitors of the main electric valves 12 and 13 and the anode-cathode circuit of firing electric valves 18 and 19. This places the system in condition to energize the load for the preheat period of pattern A. The closure of contact 106b which occurred upon the operation of relay 106 establishes a circuit through the adjustable resistor 129, the setting of which determines the rate at which the capacitor charges from its initial condition of charge determined by the setting of the preheat resistor 98 to the condition of charge dependent upon the setting of the weld resistor 99.

Thus, during the preheat period, the unidirectional voltage appearing across capacitor 94 steadily increases. The voltage of the capacitor 94 plus a reference voltage appearing between the conductor 72 of the direct-current control voltage supply and the adjustable tap 88 of the voltage-dividing resistor 89 is impressed on the conductors 92 and 83 and through switch 82 on conductors 62 and 63. With the reversing switch 82 in the position indicated in the drawings, the variable component of voltage supplied by capacitor 94 is applied in a positive sense with respect to the control members of electric valves 48 and 49. As is well understood by those skilled in the art, an increase in the magnitude of this positive unidirectional component of voltage in cooperation with the lagging alternating-current component of voltage derived from the transformer 64 advances the phase position of the instant of conduction of the electric valves 48 and 49. Without going into detail, it is believed apparent that this advance will advance the phase of the peaked voltages induced in the windings 39 of transformer 40 which, through the operation of the firing valves 18 and 19, will increase the magnitude of the current supplied to the load circuit. Therefore, the increasing charge on the capacitor 94 during the preheat interval will provide a steadily increasing magnitude of load current. As previously mentioned, the rate of charge during this interval and, therefore, the rate of increase of load current depends upon the setting of the preheat timing resistor 129. The preheat period is terminated by conduction of the electric valve 130 which is initiated when the charge on the capacitor 94 corresponds to the setting of the tap 126 of the weld-heat resistor 99, since the control member of valve 130 is maintained at substantially the voltage of the positive terminal of the capacitor 94 and the cathode of electric valve 130 is connected directly with the adjustable tap 126 on the weld-heat resistor 99. Thus, after the initial and final values of preheat current have been adjusted by the adjustable taps 101 and 126 of the resistors 98 and 99, the preheat timing resistor 129 provides means for independently adjusting the length of the preheat period.

When the valve 130 conducts at the end of the preheat period, the relay 144 is picked up as a result of its energizing winding 143 being connected in the anode-cathode circuit of the electric valve 130. The operation of relay 144 opens contacts 144a and 144e and closes contacts 144b, 144c, and 144d. The closure of contact 144c completes the initiating circuit of the timing valve 169 of the weld timer 149 and initiates the timing operation of this timer. Contacts 144a and 144b alter the connections of the conductor 86 with the preheat and weld resistors 98 and 99. These changes are important in connection with current patterns B and D when switch 87 is in the left-hand position and will be discussed at a later point in the specification. Contacts 144d and 144e shunt the manual switches 200 and 201, respectively, and are effective only when these switches are open for pulsation welding. During the weld period, valve 130 continues to conduct and capacitor 94 is maintained charged to a voltage dependent upon the setting of the tap 126 of the weld resistor 99 and the current supplied to the load circuit during the weld period is determined by this setting. At the expiration of the period for which the weld timer 149 is adjusted, the valve 169 thereof conducts and the operating coil 150 of the weld-timer relay 151 is energized to close contacts 151a, 151b, 151d, and to open contacts 151c. Closure of the contact 151a which is in shunt with the initiating contact 144c seals in the weld-timer initiating circuit. The closure of contact 151b initiates the timing period of the off-period timer 152. Opening of contact 151c opens the energizing circuit of the relay 26 and thereby terminates the supply of current to the load circuit by interrupting the circuit of the control members of the main electric valves 12 and 13 by opening the contacts 26a. The closure of contact 151d partially completes an energizing circuit for the operating coil 119 of the relay 118. It will be noted that closure of contact 151d will effect energization of the coil 119 if the contact 155a of the manual switch 155 is closed. As will be explained later, switch 155 is closed when it is desired to reduce the off-period time to zero.

After the expiration of the period for which the off-period timer is set, the operating coil 153 of the off-period timer relay 154 is energized to close the contacts 154a, 154b, and 154c. Closure of contact 154a completes an energizing circuit for the coil 119 of relay 118 from the supply lines 36 and 37. Closure of contact 154b completes an energizing circuit for the operating coil 26 of the relay 27 to close contact 26a to initiate another period of load current. Closure of contact 154c completes a shunt circuit around the timing capacitor 180 of cool-period timer 163 to preclude any possibility of the cool timer from extending the off period beyond the time for which the off-period timer is set by momentarily picking up the cool-timer relay 192.

As previously mentioned, closure of contact 154a establishes an energizing circuit for the operating coil 119 of relay 118 to effect the operation of contacts 118a to 118j, inclusive. Contact 118a closes to complete the connections of the operating coil 120 of the relay 121 in the anode-cathode circuit of the valve 130. Contact 118b opens to interrupt the charging circuit of capacitor 94 through the preheat timing resistor 129 and contact 118d closes to establish another charging circuit for the capacitor 94 through the postheat timing resistor 158. Contact 118c opens to drop out relay 144 to accomplish circuit changes which will be discussed at a later time in connection with current patterns B and D.

Contact 118e closes to complete a circuit from the postheat resistor 100 to the control member of electric discharge valve 112. Contact 118f closes to complete a circuit with the postheat resistor 100 which is of significance in connection with patterns B and D. Contact 118g, which shunts contact 151b, closes to seal in the off timer 152. Contacts 118h and 118i are connected in shunt with certain of the manual switches 200, 201, and 202 and are of interest in connection with the operation of the system for pulsation welding as has been previously described. Contact 118g opens to permit the cool timer 163 to reset.

As mentioned above, closure of contact 118d completes a circuit for the capacitor 94 through which the capacitor charges to a voltage dependent upon the setting of the tap 157 of the postheat resistor 100 and at a rate depending upon the setting of the postheat timing resistor 158. The control member of the electric valve 112 is connected with the postheat resistor and the cathode thereof is connected with the positive terminal of the capacitor 94 so that the valve 112 is rendered conductive when the voltage of the capacitor corresponds to the setting of the tap 157 of the postheat resistor. Thus, the setting of the postheat timing resistor 158 determines the duration of the postheat period once the weld-heat and postheat resistors have been adjusted to establish the desired magnitude of weld current and final postheat current. As soon as electric valve 112 conducts, the operating coil 120 of relay 121 is energized to open contact 121a which, in turn, deenergizes the operating coil 107 of the relay 106. The opening of contact 106b deenergizes the operating coil 27 of the relay 26 to terminate the supply of current to the load circuit. Opening of contact 106b also deenergizes the weld timer 149. If the initiating switch is now opened, the relays 118 and 121 are dropped out and the relay 154 of the off-period timer is dropped out and the system is returned to its initial condition, the capacitor 94 being returned to a condition of charge dependent upon the setting of tap 101 of the preheat resistor 98. During the postheat period, the decrease in voltage of the capacitor decreases the positive unidirectional voltage component impressed on the control members of the electric valves 48 and 49 to retard gradually the phase position of the instant of ignition of the main electric valves 12 and 13 to reduce gradually the magnitude of the current supplied to the load circuit.

When it is desired to supply a current pattern to the load circuit corresponding to the pattern of Fig. 2C, the reversing switch 82 is moved to the right-hand position. This reverses the polarity of the variable unidirectional voltage impressed on the control members 48 and 49 due to the capacitor 94 which now appears as a negative control voltage component. With the switch in this position, an increase in the voltage of the capacitor 94 retards the phase of the voltages induced in the windings 39 of transformers 40 and, thereby, gradually reduces the magnitude of the current during the preheat period and gradually increases it during the postheat period as illustrated in Fig. 2 by the curve designated "Pattern C."

In the preceding description of the operation of the system, an off-period has been provided between the weld period and postheat period. This off period has a duration which is adjustable by adjusting the off-period timer 152. If it is desired to omit the off period entirely, the manual switch 155 is closed, thereby closing contacts 155a and 155c and opening contacts 155b. The opening of contact 155b disables the off-period timer. The closure of contact 155a completes an energizing circuit for the operating coil 119 of the relay 118 as soon as the relay 151, controlled by the weld-period timer, is closed. The closure of contact 155c maintains the operating coil 27 of the relay 26 energized when the weld-period timer times out so that the load current is not interrupted.

In many applications, it is unnecessary that the magnitude of the current be varied during the different intervals of the load-current pattern. The illustrated embodiment of the present invention may be readily adjusted to provide a load-current pattern in which the current is of constant magnitude during each period but which is independently adjustable in magnitude for the different periods. The system is adjusted for this type of operation by moving the single-pole switch 87 to the left and moving the switching device 104 to the right. Otherwise, the switches are placed in the same positions as described in connection with the current pattern A. This places the system in condition to produce the current pattern illustrated in Fig. 2B. The operation of the system is in general very similar to that described in connection with current pattern A with the exception that capacitor 94 is now required to time the preheat and postheat intervals only and is not necessary for establishing the bias control voltage supplied to the control members of electric valves 48 and 49 during preheat and postheat periods. Inasmuch as the capacitor 94 is not now utilized as a source of bias voltage, the timing of the preheat and postheat periods may be more completely separated from the adjustments of load-current magnitudes so that it will not be necessary to readjust the preheat and postheat timing resistors 129 and 158, respectively, when it is desired to adjust the current level during these periods. This is accomplished by the switch 104 which, when moved to its right-hand position, connects the control member of valve 112 through contacts 103 and 103b with an adjustable tap 160 on resistor 95. The contact 103a when moved to the right disconnects the cathode of the electric valve 130 from the adjustable tap 126 of the weld-heat resistor 99 and connects it with an adjustable tap 161 on the resistor 96. The operation of the system in supplying pattern C will now be very briefly reviewed. The initiating switch 156 is closed, relay 106 is energized, the relay 192 controlled by the cool-period timer 163 picks up momentarily to complete the circuit for the operating coil 27 of the relay 26. This initiates a period of energization of the load circuit. The magnitude of the current during the first or preheat period of the current pattern is determined by the setting of the adjustable tap 101 of the preheat resistor 98 which is, at this time, connected with the conductor 62 through the normally closed contacts 144a of the relay 144, the conductor 86, switch 87, and the left-hand contact of switch 82. The magnitude of current determined by the setting of tap 101 is supplied to the load circuit until the electric valve 130 is rendered conductive as a result of the capacitor 94 charging through the preheat timing resistor 129 to substantially the voltage of the adjustable tap 161. Conduction of the electric valve 130 operates the relay 144 to open the connection between the adjustable tap 101 of the preheat resistor 98 and complete a circuit from the conductor 62 through the contacts 144b to the adjustable tap 126 of the weld-heat resistor 99. The operation of the system during the welding period and the off period is substantially the same as that described in connection with current pattern A. At the end of the off period, relay 118 is energized to close control 118f and relay 144 is dropped out to open contact 144b. This disconnects the conductor 62 from the weld-heat resistor 99 and connects it with the adjustable tap 157 of the postheat resistor 100. The postheat timing is accomplished in the same general manner as before by the time required for the capacitor 94 to charge through postheat timing resistor 158 to a value which will render electric valve 112 conductive to energize the relay 121 to terminate the period of energization of the load circuit. This is determined now by the setting of tap 160 on resistor 95.

Pattern D is obtained by moving the switch 82 to the right and leaving the remainder of the manual switches in the same position as just described in connection with pattern B. In this way, the increase in unidirectional voltage which results from transferring the conductor 62 from the preheat resistor to the weld-heat resistor effects a retardation in the phase of the voltages induced in the secondary winding 39 of the transformer 40 and reduces the magnitude of the load current during the weld period. Otherwise, the operation is very similar to that previously described.

It has previously been mentioned that pulsation welding, that is, intermittent energization of the load circuit, during any one or all of the periods of each pattern may be obtained by selectively opening switches 200, 201, and 202 which permit the heat and cool timers to function in the manner described in detail earlier in the specification. If switch 200 is opened, pulsation welding is obtained during the preheat period. As soon as the load is energized, the heat timer 162 starts a timing operation and, when the period expires, relay 190 is operated to open contact 190a and thereby interrupt the circuit of the operating coil 27 of the relay 26. When relay 26 drops out, contact 26a interrupts the circuit of the control members of the main electric valves to interrupt the energization of the load circuit. The closure of contact 26c upon deenergization of the winding 27 initiates the operation of the cool-period timer 153, which functions to reestablish a circuit for the winding 27 of the relay 26 after the expiration of the period for which it is adjusted. Thus, the load circuit is alternately energized and deenergized during the preheat period when switch 200 is open for periods depending upon the time settings of the heat and cool timers 152 and 163. Inasmuch as the relay 144 is energized at the expiration of the preheat period, the contact 144b thereof will complete a circuit from conductor 203 through switches 201 and 202 to conductor 204 and thereby preclude the intermittent energization of the load circuit under the control of the heat and cool timers during the weld period. The contact 118i keeps this circuit completed during the postheat period as long as switch 202 is closed. In a similar way, pulsation welding may be effected during the weld period by opening only switch 201 and during the postheat period by opening switch 202 only. It will be apparent that any two or all of the switches may be opened if pulsation welding is desired during any two or all of the periods of the current patterns. If it is desired to obtain pulsation welding during more than one of the periods of the current pattern, the heat and cool timers may be arranged to operate for different intervals during the different periods of the load current pattern. This may be accomplished by automatically changing the parameters of the timing circuits in accordance with the period of the load current being supplied. This type of control of timing circuits is described in detail and claimed in my copending application Serial No. 460,239, filed concurrently herewith, and assigned to the assignee of the present application.

From the foregoing detailed description of the illustrated embodiment of my invention together with a description of the operation thereof when it is adjusted for any one of a number of different current patterns, it is believed apparent that the present invention provides a very flexible arrangement for supplying current patterns to a load circuit which are made up of a plurality of independently adjustable periods of energization during each of which a particular current level or variation of current level is maintained. It will be noted that, in each of the patterns, a pattern of unidirectional control voltage corresponding to the desired pattern of load current is established by means of adjustable taps on the current-dividing resistors which are selectively connected in circuit with a pair of control electric valves. When the system operates to produce patterns A and C, the voltage between these settings is gradually varied during the period to give a gradual change in load current. When any of the current patterns are being supplied, the voltage existing between different pairs of taps on the voltage-dividing resistor are successively impressed on the control members of a pair of electric valves in accordance with the operation of the various timing means. The electric valve 112 controls not only the initial charge on the capacitor 94 but also the final charge thereon.

While the illustrated embodiment of my invention relates to a spot-welding system in which the electrodes remain stationary throughout the duration of the current pattern, it will be appreciated that many features of my invention are applicable to other systems such as those employed for seam welding. While the different periods of each of the current patterns have been referred to as preheat period, weld period, and postheat period, it will be understood that welding or heat treating may be accomplished during any one or all of the periods if desired and that, with the off period reduced to zero, the current pattern may represent the current pattern for a seam weld.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, electric translating apparatus interconnecting said circuits including electric valve means, control means for controlling the conductivity of said electric valve means, means for energizing said control means with a unidirectional component of voltage to effect the energization of said load circuit for an interval of time, means for establishing the initial value of said unidirectional component of voltage to establish the initial root-mean-square value of current transmitted to said load circuit at a finite value, means for establishing the final value of said unidirectional component of voltage to establish the final root-mean-square value of current transmitted to said load circuit at a finite value, and means responsive to the attainment of said final value for terminating said period of energization.

2. In combination, a supply circuit, a load circuit, electric translating apparatus interconnecting said circuits including electric valve means, control means for controlling the conductivity of said electric valve means, means for energizing said control means with a unidirectional component of voltage comprising capacitance means, means for establishing an initial charge on said capacitance means while said valve means is non-conducting to determine the initial value of current supplied to said load circuit, means for establishing a charging circuit for said capacitance to charge said capacitance means to a predetermined voltage to determine the final value of said load current including means for impressing a voltage of substantially greater magnitude on said charging means than said predetermined voltage, means for determining the charging rate of said capacitance to determine the rate of change of the root-mean-square value of current in said load circuit and the length of the interval between the initial and final values of said load current and means responsive to the charging of said capacitance means to said predetermined voltage for terminating said period of energization of said load circuit.

3. A control circuit for producing a predetermined pattern of unidirectional control voltage comprising a source of direct-current voltage, voltage-dividing means energized from said direct-current circuit for establishing a plurality of points of different potential relative to the terminals of said direct-current source, a pair of output terminals, circuit-controlling means for altering circuit connections between said output terminals and said points to impress the voltage between different pairs of said points on said output terminals, and independently adjustable timing means for determining the interval between each successive alteration of said circuit connections to determine the portion of the total pattern that the voltages of the different pairs of points are impressed on said output terminals.

4. A control circuit for producing a pattern of unidirectional control voltage having a plurality of periods comprising a source of direct-current voltage, a pair of output terminals, voltage-dividing means energized from said source of direct-current voltage for establishing a plurality of points of different potential relative to the terminals of said direct-current source, a plurality of circuit-controlling means for altering the circuit connections between said output terminals and said points to impress the voltage between different pairs of said points on said output terminals, a capacitor, means for controlling the rate of charge of said capacitor between an initial value and a second value to determine the time of operation of certain of said circuit-controlling means to terminate one period of said pattern, independent timing means for effecting operation of other of said circuit-controlling means to establish the length of a second period of said pattern, and means for controlling the charging rate of said capacitor to a third condition of charge to effect the operation of still other of said circuit-controlling means to determine the length of a third period of said pattern of voltage.

5. In combination, a supply circuit, a load circuit, electric translating apparatus interconnecting said circuits including electric valve means, a control member for controlling the conductivity of said electric valve means, means for pre-establishing a plurality of different patterns of control voltage each including a plurality of intervals during which the control voltage is controlled in a predetermined manner, and means for impressing on said control member the voltage of a selected one of said patterns to effect the transmission of a corresponding pattern of current to said load circuit.

6. In combination, a supply circuit, a load circuit, electric translating apparatus interconnecting said circuits including electric valve means, a control member for controlling the conductivity of said electric valve means, means for establishing a plurality of different patterns of unidirectional control voltage each of which comprises a plurality of intervals of different voltage magnitudes, said patterns of voltage differing from one another in the type of voltage variation during certain of the intervals of each of the patterns, means for selectively impressing one of said patterns of control voltage on said control member to effect the energization of said load circuit with a current pattern corresponding to the pattern of unidirectional voltage impressed on said control member.

7. In combination, a supply circuit, a load circuit, at least one of said circuits being an alternating-current circuit, electric translating apparatus interconnecting said circuits including electric valve means having a control member, a source of direct-current voltage, voltage-dividing means energized from said source of direct-current voltage for establishing a plurality of points of different potential relative to said direct-current source, and means for successively impressing the voltage between different pairs of said points on said control member at predetermined times during said interval to control the conductivity of said electric valve means and thereby effect the energization of said load circuit with current the root-mean-square value of which is maintained at different constant values during successive portions of said interval.

8. In combination, a supply circuit, a load circuit, at least one of said circuits being an alternating-current circuit, electric valve means interconnecting said circuits for controlling the transfer of current therebetween, a control member for controlling the conductivity of said electric valve means, means for energizing said control member including means for impressing thereon a unidirectional voltage of predetermined magnitude for a predetermined interval of time, means for maintaining said electric valve means non-conductive for a succeeding interval of predetermined duration, and means for subsequently impressing on said control member a unidirectional voltage of a second predetermined magnitude for energizing said load circuit for a second interval of time with a current of a different magnitude.

9. In combination, a supply circuit, a load circuit, at least one of said circuits being an alternating-current circuit, electric valve means interconnecting said circuits for controlling the transfer of current therebetween, a control member for controlling the conductivity of said electric valve means, means for impressing on said control member a unidirectional voltage for a predetermined interval of time, means for maintaining said electric valve means non-conducting for a succeeding interval of predetermined adjustable duration, means for subsequently impressing on said control member a unidirectional voltage of progressively varying magnitude for a second predetermined interval of time to energize said load circuit for two different intervals with currents of different magnitudes and one of which varies progressively in magnitude with a period of de-energization of predetermined duration separating said periods of energization.

10. In combination, an alternating-current supply circuit, a load circuit, electric translating apparatus interconnecting said circuit including electric valve means connected to transfer a predetermined pattern of alternating current between said supply and load circuits, a control member for controlling the magnitude of the current supplied to said load circuit, a source of direct-current voltage including means for establishing a plurality of points of different potential relative to the terminals of said direct-current source, circuit connections between different pairs of said points and said control member including circuit controlling means, and means for operating said circuit-controlling means to impress the voltage between different pairs of said points on said control member in succession, and timing means for determining the interval between successive alterations of said circuit connections to determine the portion of the total pattern of load current that the potentials of the different pairs of points are impressed on said control member to maintain the current supplied to said load circuit at a value corresponding to the potentials of said different pairs of points during the different portions of said patterns.

11. In combination, a supply circuit, a load circuit, at least one of said circuits being an alternating-current circuit, electric translating apparatus interconnecting said circuits, including electric valve means having a control member, a capacitor, means for charging said capacitor between pre-established finite values of charge, means responsive to the voltage of said capacitor for gradually varying the instant in the voltage wave of said alternating-current circuit that said electric valve means conducts as the charge on said condenser changes, and circuit-controlling means operated in accordance with the voltage of said capacitor to terminate a period of energization of said load circuit when said capacitor attains a predetermined value of charge, whereby the charging of said capacitor controls both the magnitude of the current supplied to the load circuit and the interval of energization of the load circuit.

12. In combination, a supply circuit, a load circuit, at least one of said circuits being an alternating-current circuit, electric translating apparatus interconnecting said circuits including electric valve means having a control member, a capacitor, means responsive to the voltage of said capacitor for energizing said control member to vary gradually the instant in the voltage wave of said alternating-current circuit as said electric valve means conducts as the charge on said condenser changes, means for establishing a charging circuit for said capacitor to charge said capacitor between pre-established values to effect a period of energization of said load circuit with a current the root-mean-square value of which gradually changes between values determined by said pre-established values of charge on said capacitor, means for determining the rate of charge of said capacitor to determine the duration of said period of energization of the load circuit and timing means initiated in operation when the load current reaches the second of said predetermined values for determining the duration of a second period of energization of said load circuit.

13. In combination, a supply circuit, a load circuit, at least one of said circuits being an alternating-current circuit, electric translating apparatus interconnecting said circuits including electric valve means having a control member, a capacitor, means responsive to the voltage of said capacitor for energizing said control member to vary gradually the instant in the voltage wave of said alternating-current circuit as said electric valve means conducts as the charge on said condenser changes, means for establishing a charging circuit for said capacitor to charge said capacitor between pre-established values to effect a period of energization of said load circuit with a current the root-mean-square value of which gradually changes between initial and final values determined by said pre-established values of charge on said capacitor, means for determining the rate of charge of said capacitor to determine the duration of said period of energization of the load circuit, and means for altering the charging circuit of said capacitor to initiate charging of said capacitor to still another pre-established value to effect the energization of said load circuit for a second period dependent upon the charging rate of said capacitor to said last-mentioned pre-established value and with a current the root-mean-square value of which gradually changes from said final value of said first period to the value determined by said last-mentioned pre-established value.

14. In combination, a source of direct-current voltage, means establishing a plurality of points of different potential relative to the terminals of said direct-current source, an electric valve including an anode, a cathode, and a control member, a capacitor connected to the cathode of said electric valve and to said direct-current source, switching means connecting said control member with one of said points of potential to establish a charge on said capacitor, means for operating said switching means to interrupt said charging circuit and for establishing a second charging circuit for said capacitor, means for subsequently connecting said control member with a second of said points of potential to render said electric valve conductive when the charge on said capacitor reaches a predetermined value with respect to said second point of potential.

15. In combination, a source of direct-current voltage, means establishing a plurality of points of different potential relative to the terminals of said direct-current source, a capacitor, an electric valve including an anode, a cathode, and a control member, means including switching means connecting said capacitor in a charging circuit including the voltage between a pair of said points and the control-member-to-cathode circuit of said electric valve, means for initiating a timing period including means for establishing a second charging circuit for said capacitor and interrupting the charging circuit including the control member of said electric valve, means including a second electric valve having a control member energized in accordance with the voltage of said capacitor for interrupting said second charging circuit when said capacitor reaches a second condition of charge and establishing a third charging circuit for said capacitor, means for connecting the control member of said one electric valve with another of said points of potential to render said one electric valve conducting when said capacitor reaches a third condition of charge, and means responsive to the operation of said one electric valve for terminating the timing period.

16. A control circuit comprising a source of direct-current voltage, voltage-dividing means energized from said source of direct current for establishing a plurality of points of potential relative to the terminals of said direct-current source, a capacitor, an electric valve including an anode, a cathode, and a control member, means establishing a charging circuit from one of said points including the control-member-to-cathode circuit of said electric valve to establish an initial charge on said capacitor, a second electric valve including an anode, a cathode, and a control member, means connecting the cathode of said second electric valve to a second of said points, means connecting the control member of said second electric valve to one of the terminals of said capacitor so that said second electric valve is rendered conductive when said capacitor reaches a predetermined voltage relative to said second point of potential, means responsive to conduction of said second valve for establishing a charging circuit for said capacitor to a third condition of charge, said first electric valve being arranged to become conductive when said third condition of charge is obtained to interrupt the charging circuit of said capacitor, the charging rate of said capacitor between said first and second and second and third conditions of charge being independently adjustable to determine the interval of each of the charging periods of said capacitor.

17. In combination, a source of direct-current voltage, means establishing a plurality of points of different potential relative to the terminals of said direct-current source, a pair of electric valves each including an anode, a cathode, and a control member, a capacitor, one terminal thereof connected with the cathode of one of said electric valves and with the control member of the other of said electric valves, means for establishing a circuit for charging said capacitor from said direct-current source, means connecting the cathode of said other electric valve to one of said points of potential so that said other electric valve is rendered conductive when said capacitor reaches a predetermined condition of charge, means operated in response to the conduction of said other electric valve for interrupting said charging circuit and establishing a second charging circuit for said capacitor, means connecting the control member of said first electric valve with another of said points of potential so that one electric valve is rendered conductive when said capacitor reaches a second condition of charge, and means for adjusting the charging rate of said capacitor in each of said charging circuits to determine the interval required for each of said charging operations.

18. In combination, a supply circuit, a load circuit, electric translating apparatus interconnecting said circuits including electric valve means, a control member for controlling the conductivity of said electric valve means, means for energizing said control member with a control voltage having a predetermined pattern for effecting the energization of said load circuit for a plurality of intervals during which different current magnitudes are supplied to said load circuit, a pair of independently adjustable timing means, and means for rendering said timing means effective to modify the energization of said control member to effect intermittent energization of said load circuit during any of said intervals, the adjustments of said timing means determining the relative durations of the periods of energization and deenergization of said load during the intervals that said timing means is effective.

19. In combination, an alternating current supply circuit, a load circuit, electric translating apparatus interconnecting said circuits including electric valve means having a control electrode, means for controlling the energization of said control electrode to determine the magnitude of the current transmitted to said load circuit and timing means for establishing a plurality of intervals during which said load circuit is to be energized including a capacitance, means for establishing an initial charge on said capacitance, means for establishing a charging circuit for charging said capacitance to a second value, means responsive to the charge on the capacitance for effecting a circuit controlling operation at the end of the interval required for said capacitance to charge to said second value, means for establishing a second charging circuit for said capacitance to charge the capacitance to a third value of charge, and independently adjustable resistance means, in each of said charging circuits for determining the time required for the capacitance to charge between said different values of charge.

20. In combination, a supply circuit, a capacitance, means for establishing a charging circuit for charging said capacitance from said supply circuit to change the voltage on said capacitance from an initial value to a second value, an electric valve responsive to the attainment of said second voltage for accomplishing a circuit controlling operation, means for establishing a second charging circuit for said capacitance to charge said capacitance to a third voltage, an electric valve responsive to the attainment of said third value of voltage on said capacitance for accomplishing a second circuit controlling operation, and independently adjustable resistance means in each of said charging circuits for controlling independently the time intervals required for accomplishing said first and second circuit controlling operations.

21. In combination, a supply circuit, a load circuit, at least one of said circuits being an alternating current circuit, electric valve means interconnecting said circuits for controlling the transfer of current therebetween, a control member for controlling the conductivity of said electric valve means, means for energizing said control member to effect the transmission of current of a predetermined magnitude to said load circuit for a predetermined interval, timing means including a capacitor and an electric valve for controlling the duration of said interval, a second timing means for maintaining said electric valve means nonconducting for a second predetermined interval, means for impressing a control voltage on said control member to effect transmission of current of different magnitude to said load circuit during a third predetermined interval, and means including said capacitor for determining the duration of said third interval.

22. In combination, a supply circuit, a load circuit, at least one of said circuits being an alternating current circuit, electric translating apparatus interconnecting said circuits including electric valve means having a control member, a source of direct current voltage, voltage dividing means energized from said source of direct current voltage for establishing a plurality of points of different potential relative to said direct current source, a plurality of electronic timers each including an electric valve and a capacitor for impressing the voltage between different pairs of said points on said control member at predetermined times during said interval to control the conductivity of said electric valve means and thereby effect the energization of said load circuit with current the root-mean-square value of which is maintained at different constant values during different portions of said interval.

MAURICE E. BIVENS.